United States Patent
Eker et al.

(10) Patent No.: US 8,286,251 B2
(45) Date of Patent: Oct. 9, 2012

(54) OBFUSCATING COMPUTER PROGRAM CODE

(75) Inventors: Johan Eker, Lund (SE); Björn Johansson, Lund (SE); Carl Von Platen, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 12/515,621

(22) PCT Filed: Dec. 19, 2007

(86) PCT No.: PCT/EP2007/011156
§ 371 (c)(1),
(2), (4) Date: May 12, 2010

(87) PCT Pub. No.: WO2008/074483
PCT Pub. Date: Jun. 26, 2008

(65) Prior Publication Data
US 2010/0251378 A1   Sep. 30, 2010

Related U.S. Application Data

(60) Provisional application No. 60/882,298, filed on Dec. 28, 2006.

(30) Foreign Application Priority Data

Dec. 21, 2006 (EP) .................................. 06388071

(51) Int. Cl.
*G06F 7/04* (2006.01)

(52) U.S. Cl. ........................ 726/26; 713/108; 713/109

(58) Field of Classification Search .................. 713/190, 713/189; 726/26
See application file for complete search history.

(56) References Cited

U.S. PATENT DOCUMENTS

| | | | |
|---|---|---|---|
| 6,694,435 B2 * | 2/2004 | Kiddy | 713/189 |
| 2004/0003264 A1 * | 1/2004 | Zeman et al. | 713/190 |
| 2008/0127350 A1 * | 5/2008 | Hillis et al. | 726/26 |

FOREIGN PATENT DOCUMENTS

| | | |
|---|---|---|
| WO | 99/01815 A | 1/1999 |
| WO | 2008/074382 A1 | 6/2008 |

OTHER PUBLICATIONS

Chenxi Wang et al: "Software Tamper Resistance: Obstructing Static Analysis of Programs" Technical Report CS-2000-12, [Online] Dec. 2000, XP002437560, University of Virginia, US. Retrieved from the Internet: URL: http://citeseer.ist.psu.edu/wang00software.html>.

(Continued)

*Primary Examiner* — Nathan Flynn
*Assistant Examiner* — Phuoc Tran
(74) *Attorney, Agent, or Firm* — Potomac Patent Group PLLC (57) ABSTRACT

A computer-implemented method of tamper-protecting a computer program, the method comprising: processing an input representation of the computer program to identify a function call for causing a data processing system to continue execution of the computer program at a predetermined entry point memory address when said computer program is executed by a data processing system; replacing the identified function call with a modified function call, wherein the modified function call includes an algebraic expression for causing the data processing system to compute the entry point memory address when said computer program is executed by the data processing system.

16 Claims, 2 Drawing Sheets

OTHER PUBLICATIONS

Collberg, C. and Thomborson, C. "Watermarking, Tamper-proofing, and Obfuscation—Tools for Software Protection", IEEE Transactions on Software Engineering, 28:6, Jun. 2002.

Ogiso, T. et al. "Software Obfuscation on a Theoretical Basis and its Implementation" IEICE Transactions on Fundamentals of Electronics, Communications and Computer Sciences, Engineering Sciences Society, Tokyo, JP, vol. E86-A, No. 1, Jan. 2003, pp. 176-186, XP009084952, ISSN 0916-8508.

Collberg, C. et al. "Dynamic Path-Based Software Watermarking" SIGPLAN Notices, vol. 39, Jun. 2004, pp. 107-118, XP009084970, US, ISSN: 0362-1340.

PCT International Search Report, mailed Apr. 28, 2008, in connection with International Application No. PCT/EP2007/011156.

PCT International Preliminary Report on Patentability, mailed Apr. 7, 2009, in connection with International Application No. PCT/EP2007/011156.

Zima, Hans, Supercompilers for Parallel and Vector Computers, 1991, p. 78, Section 3.4.3, Dead-code elimination, ACM Press, New York, USA.

China Intellectual Property Office, Notification to Grant Patent Right for Invention in CN200780047128.1, Sep. 23, 2011.

* cited by examiner

FIG. 6 ically, the invention relates to the tamper protection by obfuscating computer program code, in particular obfuscating the call graph of a computer program code.

OBFUSCATING COMPUTER PROGRAM CODE

TECHNICAL FIELD

The invention relates to tamper-protection of computer program code, e.g. source code or object code. More specifically, the invention relates to the tamper protection by obfuscating computer program code, in particular obfuscating the call graph of a computer program code.

BACKGROUND

Software tampering is an attack which has the purpose of altering the way a piece of software operates in such a way that it brings illegitimate benefits to the attacker. The objectives of tampering could be to side-step copy protection or security mechanisms, to extract secret or copyrighted material, to introduce malicious code such as computer viruses, or the like.

In many situations, the illegitimate benefits may involve substantial financial disadvantages for software producers. Consequently, both attackers and software vendors may be expected to make significant efforts to break and improve protection mechanisms against software tampering, respectively. In the context of mobile phones, protection of the SIM-lock and other sensitive software components, e.g. Digital Rights Management (DRM), are of particular interest. However, tamper protection of other software entities may also be beneficial.

In order to modify a software component, an attacker typically has to acquire at least a partial understanding of how the software component functions. Software tampering may thus be delayed if not prevented by making reverse engineering more difficult. Transformations, which make the software harder to analyze are useful to this end; such transformations are generally referred to as obfuscation.

Techniques for reverse engineering software may roughly be divided into two groups of techniques: Static (or "offline") code analysis and dynamic (or "live") code analysis. When performing dynamic analysis, the software is observed as it is executing. In contrast, static analysis is usually limited to an examination/analysis of some representation of the program code, without actually executing it.

Typically, the executable code or machine code of the computer program is the only representation available to an attacker, i.e. the attacker has typically not access to the source code. Consequently, a typical initial step of reverse engineering a computer program includes the creation of a higher-level representation of the executable code using static code analysis.

In this context, function calls are an interesting target for a reverse-engineering attack, since a correct identification of the relation between call sites (i.e. the program points from which function calls are made) and the entry point of each function (i.e. the program points to which the calls are made) is useful for an attacker in order to the understand a computer program. This information is commonly represented in the form of a program's call graph, in which each function constitutes a node and each function call a directed edge from the caller function to the called function. Constructing the call graph is thus a frequently applied first step of a reverse-engineering attack.

Consequently, it is generally desirable to complicate if not prevent the construction of a call graph or a similar analysis of the relations between function calls and function entry points by an attacker, so as to make static analysis and reverse engineering of a computer program more difficult. Generally, even if the analysis of a computer program may not be completely prevented, a delay in such an analysis by attackers alone may cause a significant delay in any tampering attempt, thus extending the period of time during which a computer program may be supplied and used without the risk of misuse.

Previous attempts to make reverse engineering by static analysis more difficult include attempts to encrypt the executable code. This technique thus requires decryption of the code before it can be executed. Such attempts based on encryption techniques include software-based and hardware-based techniques.

In software-based techniques the keys and the algorithms used for decryption are typically embedded in the code. Consequently, as long as a skilled attacker can read the executable code and observe its execution, it is possible to use the program to decrypt itself. In this way, an attacker can relatively easily arrive at the original representation of the program, which then can be analyzed by existing tools. Therefore, the transparency of software-based encryption is a weakness of such approaches.

Hardware-based techniques, on the other hand, perform the combined decryption and execution by specific hardware. Even though properly implemented hardware-based decryption techniques can offer good protection, this protection is achieved at the price of additional, specific hardware.

Generally, obfuscation is the process of transforming a computer program into a semantically equivalent one which is harder to understand (by humans and/or analysis tools) and thus impedes static analysis. Some obfuscating transformations mainly target the control flow of the program, others mainly target data.

The article "Watermarking, Tamper-proofing, and Obfuscation—Tools for Software Protection" by Christian S. Collberg and Clark Thomborson, IEEE Transactions on Software Engineering, 28:6 (June 2002) discloses a number of obfuscation techniques.

So-called anti-disassembler transformations have the purpose of confusing disassemblers—i.e. tools that convert executable code (machine code) into a text representation (assembly language)—so as to complicate static analysis of a computer program.

Existing transformations for obfuscating the flow of control of a computer program focus on control flow that is local to functions. The task of determining the overall program structure and constructing the call graph is thus not made significantly more difficult.

Hence, it remains a general problem to provide efficient methods of obfuscating program code so as to make it more difficult to analyse the call graph of the program, e.g. in order to identify the overall program structure.

SUMMARY

The above and other problems are solved by a computer-implemented method of tamper-protecting a computer program, the method comprising:

processing an input representation of the computer program to identify a function call for causing a data processing system to continue execution of the computer program at a predetermined entry point memory address when said computer program is executed by a data processing system;

replacing the identified function call with a modified function call, wherein the modified function call includes an algebraic expression for causing the data processing system to compute the entry point memory address when said computer program is executed by the data processing system, wherein the algebraic expression represents a decoding function for computing the entry point memory address from a set of parameters;

determining a respective parameter value of each of the set of parameters from an encoding function corresponding to the decoding function;

generating an executable representation of the computer program from the input representation, wherein the executable representation includes one or more computer-executable instructions for causing the data processing system to assign the determined parameter values to respective ones of the set of parameters.

Consequently, the method described herein provides a transformation of a software component, where the transformed software component computes the target address/entry points of one or more function calls rather than providing the target address as a constant, thereby obstructing the subsequent detection of the relation between call sites and function entry points by a possible attacker, e.g. by means of standard techniques for call-graph construction.

As the entry point address of the function referred to by an identified function call is encoded using a predetermined encoding function, an algebraic expression may represent a decoding function for computing the entry point memory address from a set of parameters. Consequently, rather than providing the entry point as part of the program, an encoding of it is used. At each call site of the program, the embodiments of the tamper-protection process insert a corresponding decoding function which—during execution of the program—is evaluated in order to compute the entry point address. Furthermore, the encoding of the memory address as a set of parameter values from which the memory address can be calculated during program execution by means of the corresponding decoding function provides a mechanism for an improved obfuscation of the actual target addresses. For example, different decoding functions may be used for different call sites.

Furthermore, embodiments of the method described herein are well-suited for inter-procedural control flow, i.e. transformations from function call to function call, where the context of the caller needs to be preserved until the point at which the execution of the called function is completed.

Embodiments of the method described herein are particularly useful for obfuscating function calls including a function name for identifying the function to be called and a mechanism for passing one or more function parameter values to the function, and wherein replacing the identified function call with a modified function call comprises replacing the function name by executable code including the algebraic expression for computing the entry point memory address of the function.

Generally, the address of a function's entry point is not determined until link time and, in particular, the address is not known at compile time. Accordingly, the method further comprises:

determining a respective parameter value of each of the set of parameters from an encoding function corresponding to the decoding function;

generating an executable representation of the computer program from the input representation, wherein the executable representation includes one or more computer-executable instructions for causing the data processing system to assign the determined parameter values to respective ones of the set of parameters.

It is an advantage of the method described herein that it provides an efficient method for handling the transformation of link-time constants.

It is an advantage of the method described herein that it provides a high degree of protection of a software component against reverse engineering by static analysis.

In particular, it is an advantage of embodiments of the method described herein that they impede attempts to construct the call graph of a software component by static analysis. The call graph is a useful representation of a piece of software and greatly facilitates the understanding of a software component by humans and/or by subsequent automated analysis. Consequently, by making the analysis/construction of the call graph of a software component more difficult, techniques employed by standard tools for reverse engineering are efficiently blocked or impeded. Furthermore, yet-to-be-designed static analyses that are targeted towards breaking this particular protection are made difficult by embodiments of the method described herein, since they increase the complexity of these attacks for them to be successful.

It is a further advantage of the method described herein that the resulting executable image does not facilitate restoration of the original representation of the program.

The function calls may be represented in different ways, generally depending on the input representation. For example, different programming languages may have different mechanisms for function calls, i.e. mechanisms for causing the execution of the computer program to continue at a predetermined entry point address when the execution reaches a certain call site. Typically, in a source code representation, function calls include a function identifier or function name identifying the function to be called. Optionally, the function call may further specify one or more parameters/variables to be passed to the function. Upon termination, a function causes the computer program to return to the calling site and continue execution of the computer program from the calling site onwards. Optionally, the function may return a return value upon return to the calling site. In some programming languages, some types of function calls may be referred to as "procedure calls" or the like, e.g. in order to distinguish between functions providing a return value and functions that do not provide a return value. Furthermore, some programming languages may include other types of function calls which merely cause execution of the computer program to continue at a predetermined address. This type of function call is typically referred to as a goto-statement. In the context of object-oriented programming references to methods may be regarded as function calls. For the purpose of the present description, the term function call is intended to include all such program statements that cause a data processing system to continue execution of the computer program at a predetermined entry point memory address, typically different from the address subsequent to the memory address of the calling site.

In particular, in some embodiments generating the executable representation includes transforming the input representation into a preliminary executable representation;

modifying the preliminary executable representation to include the one or more computer-executable instructions for causing the data processing system to assign the determined parameter values to respective ones of the set of parameters.

In one embodiment, replacing further includes inserting one or more program statements into the input representation for assigning a respective preliminary value to each of the set parameters; and wherein modifying includes modifying one or more computer-executable instructions corresponding to the inserted one or more program statements to cause the data processing system to assign the determined parameter values to respective ones of the set of parameters.

Consequently, the generation of the preliminary executable program may be performed at least in part by standard tools, e.g. standard compilers and/or linkers. For example, a pre-processing module may identify and replace function calls in the source code, determine an encoding function, and insert program code for the setting of encoding parameters to preliminary values. Alternatively, these steps may be performed as an integrated part of the compiler. After the compilation and linking of the program code, a post-processing module may thus modify the resulting instructions for setting the encoding parameters in correspondence with the actual entry point addresses resulting from the linker stage.

In some embodiments, the method includes parsing the input representation so as to identify the function calls included in the input representation, and replacing each identified function call. When the method further comprises identifying a plurality of function calls and replacing the function calls by respective modified function calls, wherein each modified function call corresponds to a different decoding function, different encodings are provided for different call sites, thereby making it more difficult for an attacker to identify the actual relations between call sites and function entry points.

More ambitious techniques for call-graph constructions may make an effort to analyze calls via function pointers. Normally such techniques are employed to analyze source code, but an adaptation to a low-level representation may be made the basis of a possible attack. One approach may be to base the analysis on a "points-to analysis," the objective of which is to find the set of functions to which a pointer may refer. Even though exact points-to analysis may be impractical, an overestimation of the set of possible functions may be computed. However, a points-to analysis is generally based on the assumption that each function pointer is initialized using a function name (or constant in the case of a low-level representation) somewhere in the program, which is not the case in the transformed code.

Rather than using standard techniques for pointer disambiguation, an attack may be directed towards the decoding function. The knowledge that the encoded address words are constant or that the initial values form a valid encoding would facilitate such an attack immensely. In both cases local analysis using a technique called constant folding may be sufficient.

In some embodiments, the method further comprises:
providing an extended encoding function representing a many-to-one relation between a memory address and the set of parameters, wherein a plurality of sets of parameter values of the set of parameters encode the memory address;
inserting one or more additional program statements adapted to cause the data processing system to change a current set of parameter values of the set of parameters from a first one of the plurality of sets of parameter values to a second one of the plurality of sets of parameter values when said program code is executed by the data processing system.

Consequently, by providing an extended, i.e. non-injective, encoding, the encoding may be changed during execution of the program code such that the different encodings all encode the same entry point. Hence, when the encoded values change during the execution of the program code the recovery of the entry points by an attacker based on a static analysis of the program code, e.g. by means of constant folding, is prevented.

When the one or more additional program statements include one or more parameter pointers to respective memory addresses for storing the set of parameter values, the relation between the changes in the encoding parameters are further obfuscated and an attack by means of standard data-flow analysis is made more difficult.

In some embodiments, the method further comprises inserting one or more auxiliary program statements adapted to cause the data processing system to assign a set of temporary parameter values to the set of parameters; wherein the set of temporary parameter values results in a value of the decoding function different from the entry point memory address. In particular, in one embodiment the one or more auxiliary program statements are adapted to cause the data processing system to assign the set of temporary parameter values to the set of parameters as a set of initial values.

Consequently, when the inserted instructions cause the encoded values to change over time such that they temporarily, in particular when they are not used for actual function calls, assume values that do not form a valid encoding of the entry point(s), it is made more difficult for an attacker to recover the actual entry points. In particular, when the initial values of the encoding parameters do not form a valid encoding, but when the code includes subsequent instructions for modifying the values to a valid encoding, an attacker is prevented from recovering the entry points using the formulas that can be found in the object code of the transformed program.

In one embodiment, the method comprises:
identifying a dispatch table including one or more references to respective entry point addresses;
inserting respective one or more executable statements into the input representation for calculating the entry point addresses;
replacing said one or more references with pointers to corresponding ones of the inserted executable statements.

Hence, polymorph function calls may be obfuscated by the same technique as normal ("monomorph") function calls.

Even though other types of input representations may be used as well, e.g. object code generated by a compiler, the identification and replacement of function calls described herein will generally be particularly efficient when the input representation includes source code, i.e. is provided in the form of one or more source code modules.

The term "program statement" as used herein is intended to include a unit of structuring a programming language, in particular a minimal unit of such structuring. Examples of kinds of statements include definitions, declarations, assignments, conditional statements, loops, and function/procedure calls.

The term "expression" in a programming language as used herein is intended to include a combination of values, variables, and functions, etc., wherein the combination is interpreted according to the particular rules of precedence and of association for a particular programming language, which combination is adapted to produce and return a result, i.e. a value. An algebraic expression may produce a numeric result, e.g. a result having a numeric data type, e.g. a floating point data type or an integer data type. However, an algebraic expression may also produce a result of another data type, or a result that may be cast into another data type.

In embodiments of the method described herein the transformed program code causes the data processing system to produce the same program output as the original program code, when said program code is executed by said data processing system. Hence, the transformation of the program code is semantic-preserving, i.e. has no influence on the program output created by the computer program.

The term "program output" as used herein is intended to include any observable behaviour during execution of the program, e.g. any program behaviour that is observable/noticeable by a user, by another computer program, by another device, or the like. Examples of program output include the output of numeric values, text output, binary output, output signals, visual, e.g. graphical, output, audible output, etc. that may be output via any suitable output device such as a computer screen, printer, storage medium, communications interface, etc., via a data interface, or the like.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general-or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means and/or the program code to be transformed may be loaded in a memory, such as a RAM (Random Access Memory), from a storage medium or from another computer via a computer network. Alternatively, the described features may be implemented by hardwired circuitry instead of software or in combination with software.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

In particular, according to one aspect, a data processing system is suitably configured to perform the steps of the method described above and in the following.

According to another aspect, a computer program product comprises computer-executable instructions adapted to cause, when executed on a data processing system, the data processing system to perform the method described above and in the following. In some embodiments, the computer program product is embodied as a computer-readable medium having stored thereon the computer-executable instructions. For example, the computer-readable medium may be a compact disc (CD), an optical disc, a diskette, a magnetic storage medium, a memory stick, or the like, that has stored thereon the computer-executable instructions. For example, the computer-readable medium may have stored thereon a software application for tamper-protecting program code. In other embodiments, the computer program product is embodied as a data signal, e.g. a suitably modulated carrier signal. For example, the computer-executable instructions may be provided for download from a server computer via a computer network.

In one embodiment, the computer program-product comprises a source-code transformer and a postprocessor. The source-code transformer is adapted to identify function calls of a computer program component to be protected, to select an encoding and to transform the function calls. The postprocessor is adapted to encode the function entry points (addresses) and to transform the executable image. Hence, the computer program product may be used in connection with conventional software development tools, e.g. including a conventional compiler and linker.

In another embodiment, the computer program product comprises a set of software generation tools, e.g. a compiler and a linker, comprising functionality adapted to cause the data processing system to perform the method described above and in the following, e.g. as one of a number of compilation passes performed by the compiler and as one or more linker steps performed by the linker. Hence, an integrated software tool for tamper-protection, compilation, and linking may be provided. Furthermore, since embodiments of the tamper-protection described herein involves some of the same code analysis techniques for analysing source code as conventional compilers use, the corresponding software functionality may be reused, thereby providing an efficient software implementation.

For the purpose of the present description, the terms storage means/device/medium and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which.

In the drawings, same reference signs generally refer to same or corresponding features, elements, components, steps, or the like.

DETAILED DESCRIPTION

Figure 1:
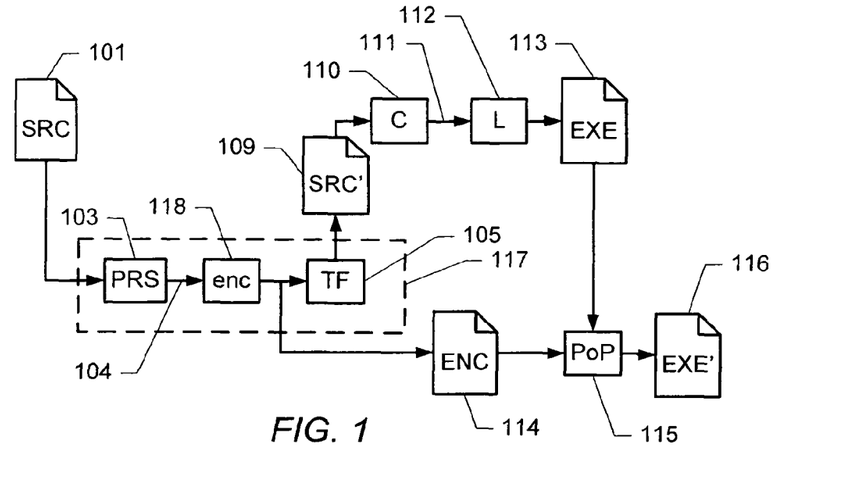
FIG. 1 shows a schematic block diagram of an example of a process for tamper-protecting program code.

FIG. 1 shows a schematic block diagram of a process for tamper-protecting program code. In particular, FIG. 1 illustrates the work-flow at build time of a software component.

The process receives a source code 101. The source code 101 is typically in the form in which a computer program has been written by a programmer, typically in a formal programming language such as C, C++, Java, or the like. The source code can be automatically compiled by a compiler into object code or machine code or executed by an interpreter. The source code 101 may be represented as one or more text documents or as any other suitable digital representation. Alternatively, the tamper-protection process may receive a different type of input representation in which function calls can be identified, e.g. object code.

The source code 101 is fed into a parser module 103. The parser module parses the source code and identifies one or more function calls in the source code. The parser module may use any suitable technique for parsing a source code known in the art, for example a subset of the techniques used by conventional compilers when parsing source code as to identify the structural components of the corresponding programming language. The parser may select all or just a subset of identified function calls. For example, the parser may include a user interface allowing a user to manually select function calls to be transformed. Alternatively or additionally, the parser may select or deselect certain types of function calls. The parser module forwards the identified function calls 104, or at least pointers to their respective locations in the source code, to an encoding module/block 118. The encoding module 118 encodes the identified function calls as described herein and provides the resulting encoding information 114 about the encoding function(s) used for the encoding of the identified function call(s) as an output. The encoding information is also forwarded to a code transformation module/block 105.

The transformation module 105 transforms the identified function calls into an encoded function call adapted to compute the entry point address of the called function based on the selected/generated encoding from the encoding module 118. The transformation module 105 replaces the original function calls in the received source code by the encoded function calls, resulting in a transformed version 109 of the source code. The transformation module may insert further program statement, e.g. for initialising and/or changing encoding parameters as described herein. The transformed source code 109 is fed into a compiler 110, e.g. a conventional compiler, which compiles the transformed source code to generate corresponding object code 111. The object code 111 is subsequently processed by a linker 112 which links the object code and generates an executable code image 113.

The symbolic addresses of the function entry points are link-time constants, which means that they are not determined when the source code is transformed. For this reason, the second step of the encoding is performed by a post-processor 115 after the linker has resolved symbols. The post-processor patches the executable code image 113 so that the encoded entry point address words corresponding to the identified function calls are inserted into the image.

To this end, the post-processor module 115 receives the encoding information 114 from the transformation module 105 and the executable code 113 from the linker 112. The post-processor 115 module identifies the instructions in the executable code 113 that define the encoding functions, e.g. instructions that set the values of encoding parameters. The post-processor 115 further identifies, e.g. from a map file generated by the linker, the memory addresses of the entry points of the functions that are called from the encoded call sites. From the actual entry point addresses and the information about the encoding function 114, the post-processor 115 determines the correct values of the encoding parameters, and modifies the identified instructions so as to assign the correct values to the encoding parameters, thus resulting in a transformed—or "patched"—executable code image 116. The resulting transformed executable code may subsequently be further processed, e.g. compressed, encrypted, and/or the like.

The parser 103, the encoding module 118, and transformation module 105 may be implemented as a combined pre-processor module 117 which will also be referred to as a source-code-transformer. Hence, in the example of FIG. 1, the encoding process is implemented in the source-code transformer 117 and the post processor 115. It is performed when the software is built, whereas the decoding process is performed by the transformed code and thus takes place when the software 116 is executed.

In one embodiment, the postprocessor 115 receives the following input:
   The symbolic names of the function entry points, which are the address words to be encoded,
   The formula by which the address words are to be encoded, i.e. the encoding function, or other suitable information identifying the encoding function. For example, the post-processor may receive an identifier indicative of one of a set of predetermined encoding functions. Alternatively or additionally, a predetermined encoding function may be parametrised by one or more parameters, such that each selection of parameter values corresponds to another function. In such an example, the post-processor may receive the selected parameter values.
   The actual value of each symbol (the constant address), and
   The location of the encoded representation within the executable image.

The first two pieces of information are provided by the source-code transformer 117 and the latter two are provided by the linker 112, for instance in the form of a linker map file.

In summary, rather than just compiling the original source code and linking the resulting object code, the process of FIG. 1 transforms the source code of the software component to be protected prior to compilation. Constants, which are used by the transformed code are also produced by the source-code transformer. The transformed source-code is compiled and linked, after which the resulting image is patched by the postprocessor, so that the transformed constants are inserted into the image.

Figure 2:
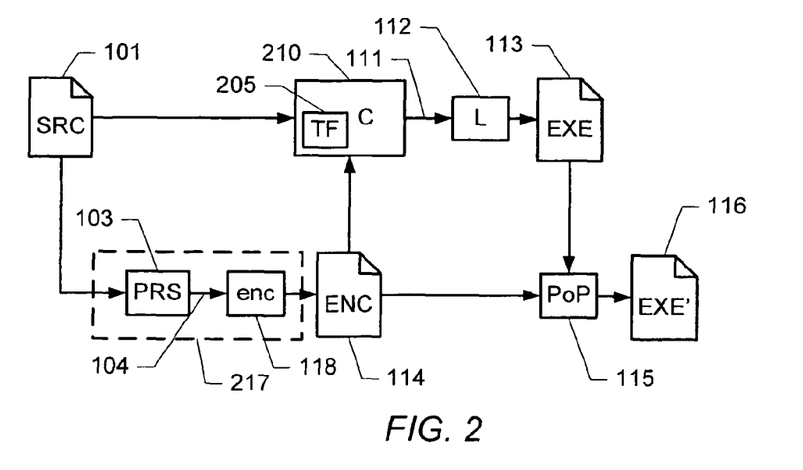
FIG. 2 shows a schematic block diagram of an example of a process for tamper-protecting program code.

FIG. 2 shows a schematic block diagram of another example of a process for tamper-protecting program code. The process shown in FIG. 2 is similar to the process in FIG. 1 and will therefore not be described in detail again. However, in the process of FIG. 2 the source-code transformation 205, which in the example of FIG. 1 was performed by a module 105 of the pre-processor 117, is integrated into the compiler 210, thereby allowing support for programming languages that do not allow direct manipulation of function pointers. Consequently, the process of FIG. 2 includes a preprocessing block 217 which receives the source code 101, parses the source code (block 103) to identify the function calls, and generates (block 118) the encoding of the identified function calls, e.g. as described in connection with FIG. 1. The encoding information 114 is forwarded from the encoding block 118 to the modified compiler 210. The modified compiler 210 further receives the original source code 101 and performs both the transformation 205 and the compilation as an integrated process. The subsequent linking and post-processing steps may be performed as described in connection with FIG. 1.

As described in connection with the examples of FIGS. 1 and 2, the process encodes the entry point address referred to by each call site by an encoding function. The encoded address is stored in the executable image. The source code of the software component is transformed in such a manner that all functions are called via references/pointers, whose values are computed based on encoded parameters stored in the executable program, thus decoding the parameters again. In the following, examples of encoding functions will be described in greater detail.

Figure 3:
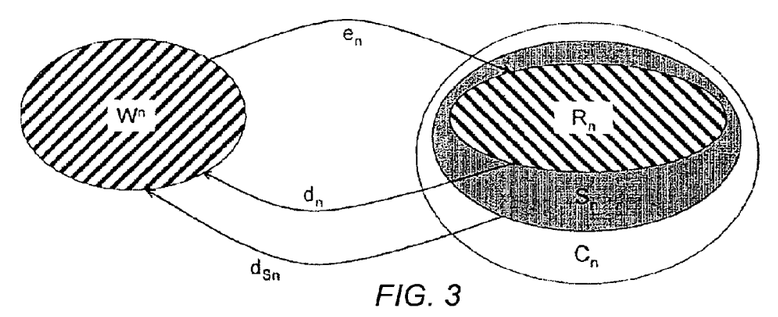
FIG. 3 schematically illustrates an example of an encoding of an entry point address.

FIG. 3 schematically illustrates an example of an encoding of an entry point address. Generally, the process described herein transforms a collection of address words $W_k \in W$, $k=1,2,\ldots,n$. Each address word denotes the entry point of a function and can be represented as an integer. For example, a reasonable assumption is that $W=\{0, 1, \ldots, 2^B-1\}$, where B is the word-length of a particular target architecture.

Let an n-dimensional encoding function $e_n: W^n \rightarrow C_n$ be an injective (one-to one) mapping from n-tuples of address words, $W_n$, some encoded representation, $C_n$. The injectivity of the encoding function is a sufficient condition for the existence of an n-dimensional decoding function, $d_n: R_n \rightarrow W_n$, where $R_n = e_n(W_n) \subseteq C_n$, such that the composite function $d_n \circ e_n$ is the identity function on $W^n$. For the purpose of the present description, it will be assumed that $C_n$ is an m-tuple of address words, for some $m \geq n$. However, it will be appreciated that other encoded representations may be used.

It is useful to define an extension, $d_{Sn}$, of d to some superset $S_n \supset R_n$ of $R_n$ so that the extended decoding function $d_{Sn}$ is not injective (one-to-one). In this way, alternative encodings of the address words can be constructed, i.e. such that $d_{Sn}(a)=d_{Sn}(b)$ does not imply that $a=b$. Given a specific extended decoding function, $d_{Sn}$, and an n-tuple of address words, w, the process can choose any encoding, c, such that, $w=d_{Sn}(c)$. FIG. 3 illustrates the relation between the sets $W^n$, $R_n$, $S_n$, and $C_n$ and the functions $e_n$, $d_n$ and $d_{Sn}$.

Hence, in summary, the n-dimensional encoding function, $e_n$, transforms a collection of n address words ($W^n$) into some encoded representation ($C_n$). The range of $e_n$ is a subset of $C_n$ called $R_n$. The n-dimensional decoding function $d_n$ is a function from $R_n$ to $W^n$, and $d_{Sn}$ is an extension of $d_n$ to a larger subset of $C_n$ called $S_n$.

In the following, the encoding process and the properties of the encoding functions disclosed above will be further illustrated by means of an example of a 2-dimensional encoding function. To this end, the following example of an encoding function $e_2 W^2 \rightarrow C_2$ is considered:

$$e_2(w) = (w_1 \oplus m_1, w_2 \oplus m_2, 0).$$

Hence, the encoding function $e_2$ uses the exclusive OR to encode the two address words $w_1$ and $w_2$. Here, the operator $\oplus$ represents the exclusive OR, and $(m_1, m_2) \in W^2$ are arbitrarily chosen constants. The range of $e_2$ is $R_2 = W^2 \times \{0\}$, and a corresponding decoding function, $d_2: R_2 \rightarrow W^2$ is given by:

$$d_2(c) = (c_1 \oplus m_1, c_2 \oplus m_2).$$

Hence, the encoded address word is given by a collection of variables $c_1$ and $c_2$. An extended decoding function $d_{S2}$ may now be constructed. For example, the decoding function may be extended from $R_2$ to $S_2 = W^3$ defining $d_{S2}$ as follows:

$$d_{S2}(c) = (c_1 \oplus c_3 \oplus m_1, c_2 \oplus c_3 \oplus m_2).$$

Accordingly, $d_{S2}$ provides several alternative encodings for each 2-tuple of address words. If foo and bar are entry points of two functions and the two constants are $m_1=1$ and $m_2=2$, the address words w=(foo,bar) are encoded in c' as follows:

$$c' = e_2(foo, bar) = (foo \oplus 1, bar \oplus 2, 0) = (c_1, c_2, c_3)$$

The original address words result from applying $d_2$:

$$d_2(c') = d_2(foo \oplus 1, bar \oplus 2, 0) = (foo \oplus 1 \oplus 1, bar \oplus 2 \oplus 2) = (foo, bar).$$

The extended decoding function, $d_{S2}$ produces the same result:

$$d_{S2}(c') = d_{S2}(foo \oplus 1, bar \oplus 2, 0) = (foo \oplus 1 \oplus 1 \oplus 0, bar \oplus 2 \oplus 2 \oplus 0) = (foo, bar).$$

Further, the extended decoding function allows the following alternative encoding of the address words:

$$c'' = (foo \oplus 101, bar \oplus 102, 100),$$

since $$d_{S2}(c'') = d_{S2}(foo \oplus 101, bar \oplus 102, 100) = (foo \oplus 101 \oplus 1 \oplus 100, bar \oplus 102 \oplus 2 \oplus 100) = (foo, bar).$$

As described in connection with FIGS. 1 and 2, the encoding of address words is performed in two steps. First, the parser module of the pre-processor module identifies the address words that are to be encoded, namely the symbolic addresses that denote entry points of functions. Furthermore, the encoding block of the pre-processor module selects an encoding function and a corresponding decoding function. For example, in the above example of the encoding functions $e_2$, the encoding block may select random pairs of constants $m_1$ and $m_2$.

In one embodiment, the address word used by each call site is encoded separately. Since several call sites may refer to the same function, this scheme may create multiple, distinct encodings for the same address word.

Again referring to FIG. 1, in one embodiment, the transformation block 105 receives the identified functions that are referenced in the original source code and each of them is represented by a particular address word, $w_k$, $k=1,2,\ldots,n$. Further, the transformation block receives information about the decoding function, d, selected by the encoding block 118. For example, the encoded address words, c, may be given as a collection of variables, $c_1, c_2, \ldots, c_n$.

Some programming languages, such as the C programming language, may have several features that are useful for the purposes of the process described herein, namely support for function pointers, and the support for an interpretation of values of integer type as function pointers.

For example, in the C programming language, the name of a function denotes a function pointer, which points to the entry point of the function in question. The normal usage is in the context of a function call, but the name of a function can also be used to create a value of function-pointer type. Consequently, an embodiment of the source-code transformer described herein may be adapted to operate on source code written in the C programming language.

The transformation removing all direct references of function names in the executable code may thus be achieved by replacing each direct reference by code that computes the corresponding address word, $w_k$, given an encoding, c, of all the address words.

In the above example of the functions foo and bar, foo may be represented by $w_1$ and bar by $w_2$. For example, the encoding block may select the extended decoding function $d_{S2}$ described above, and the source code transformer may then replace each reference to foo in the source code by $c_1 \oplus c_2 \oplus 1$ and each reference to bar by $c_2 \oplus c3 \oplus 2$. Table 1 illustrates examples of the transformation of direct references to function names in source code in the C programming language. In particular, table 1 shows an example involving the creation of a value of function-pointer type and an example involving a normal function call.

TABLE 1

Examples of source-code transformations

| Original source code | transformed source code |
|---|---|
| // Initialization of function pointer<br>typedef int (*funptr_t)(int);<br>funptr_t p = foo;<br>// Direct call of function<br>bar(42); | // Initialization of function pointer<br>typedef int (*funptr_t)(int);<br>funptr_t p = (funptr_t)(c1^c3^1);<br>// Direct call of function<br>((funptr_t)(c2^c3^2))(42); |

Hence, in the example of table 1, the functions foo and bar are referenced in the original source code: foo is used to initialise a function pointer p, whereas bar is used directly in a function call. The transformed direct call of bar uses the type definition funptr_t to increase readability. Alternatively, the type cast may be expressed directly, without a type definition: ((int(*)(int)).

The transformed function calls may be further obfuscated, e.g. by writing the decoded address word to some memory location and later reading it via a pointer alias to the same location, thereby making it more difficult for an attacker to relate the decoding and the call. Further examples of obfuscating the transformation includes disguising the encoded calls as ordinary function calls via function pointers or dispatch tables, which are common constructs in e.g. C and C++ programs and many other programming languages. By disguising/obfuscating the transformed calls, they are not easily spottable by an attacker.

Figure 4:
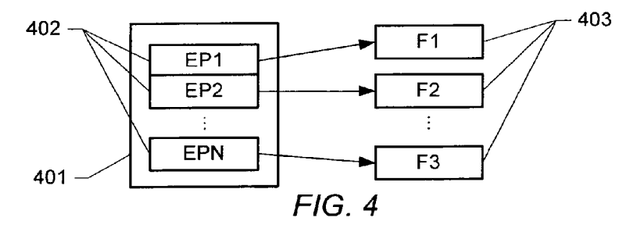
FIG. 4 schematically illustrates a dispatch tables prior to conversion.

In the following, an embodiment of the method described herein will be described with reference to FIGS. 4 and 5 that include the transformation of function calls implemented as dispatch tables.

Dispatch tables are a widely used technique, e.g. when implementing late binding in object-oriented programming. Generally, a dispatch table includes a list of pointers to the actual implementation of each method/function. FIG. 4 schematically illustrates a dispatch tables prior to conversion. The dispatch table 401 includes a list of pointers 402 to respective functions 403.

Figure 5:
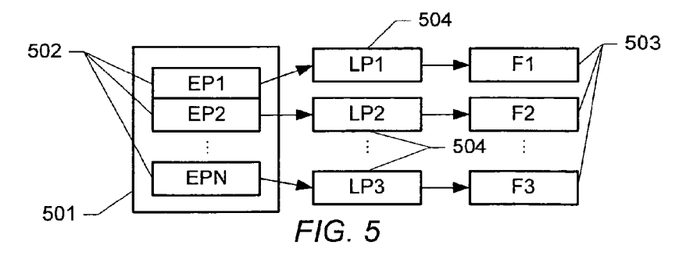
FIG. 5 schematically illustrates an example of a conversion of dispatch tables.

FIG. 5 schematically illustrates an example of a conversion of dispatch tables. The transformed dispatch table 501 includes a list of pointers 502 to respective memory addresses 504 that are the starting locations of respective sequences of executable code adapted to compute the corresponding function entry point 503 and to forward the call by branching to the computed entry point 503. The memory location of the executable code for computing the function entry point will also be referred to as a "landing pad."

In this embodiment, the source-code transformer transforms the dispatch tables and generates the "landing pads," i.e. the source-code-transformer generates and inserts the executable code of the landing pad in the source code. The computation of the entry point by the landing pad may be performed by a decoding function or an extended decoding function selected by the encoding block as described herein.

Although a static analysis of the thus transformed code may identify the relation between call sites and the corresponding "landing pads", it is significantly harder for an attacker by means of static analysis to associate each "landing pad" with the function originally referred to by the dispatch table. In this way, calls via dispatch tables may be protected using the same mechanisms as direct calls.

If several dispatch tables refer to the same function, the source-code transformer may either use the same "landing pad" or generate multiple ones. The latter approach makes it harder for an attacker to find the relation between super classes and subclasses in object-oriented languages. Rather than relying on a dispatch table, polymorphism can also be implemented by maintaining the encoded address words as part of the state of an object, i.e. its instance data. In yet another embodiment, a pair of encoding and, optionally extended, decoding functions are chosen for each class. To support inheritance, the decoding function of a subclass may extend that of its super class. In this way it is possible to avoid the "landing pads" and the references to the same from the transformed dispatch table.

The use of dispatch tables, on the other hand, may be advantageous for classes that are part of the protected software component's interface, since further inheritance cannot be supported without revealing the encoding function.

In the following, an embodiment of the method disclosed herein will be described that provides a mechanism for varying the encoding over time, i.e. in the course of the execution of the transformed program code. Such a mechanism prevents the variables $c_k$ and thus the encoded address words from being identified by an attacker as being constant (i.e. never modified). Hence, this mechanism makes it more difficult for an attacker to statically determine the function entry points.

Accordingly, in this embodiment, the pre-processor selects an extended decoding function and inserts code in the source code that causes the encoding to be altered as the code of the transformed component is executed, thus causing the encoded address words to be updated as part of the transformed code. The exact form of the update may depend on the actual extended decoding function.

For example, in connection with the example of the extended encoding function $d_{S2}$ described above, the decoding can be updated in the following manner:

$$c' = (c_1 \oplus k, c_2 \oplus k, c_3 \oplus k), \text{ for any } k \in W.$$

A further obfuscation of the encoding may be provided by updating the encoding via pointers to the actual data, thus making an attack by standard data-flow analysis more difficult. For example, rather than accessing c' directly, the program statement for updating c' may access it via one or several aliases (i.e. different pointers) that point to c'. Thus, in order to correctly identify the updates, a static analysis would have to disambiguate the pointers, which significantly complicates the undesired analysis.

If the software component may be executed in multiple execution threads, the update of the encoding may be protected, e.g. by maintaining the encoded representation as part of the state that is unique to each thread, e.g. on the run-time stack.

Furthermore, when updating the encoding, the encoding may be allowed to be temporarily left in an inconsistent state. In particular, for the purpose of the correct decoding of the function calls by the program during execution, it suffices to maintain a partially valid encoding that does not incorrectly affect the decoding of any address word that is used in a function call. It may for example be desirable that the initial state of the encoding parameters does not constitute a valid encoding of all address words.

In particular, the pre-processing block may identify the functions that form the interface of the software component to be transformed, thus ensuring that the component is only entered via one of these interface functions. The pre-processor can thus ensure that the inserted code for updating the encoding parameters establish a valid encoding only when entering one of the interface functions for the first time.

Figure 6:
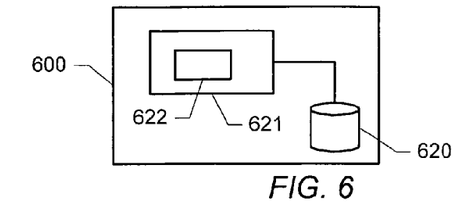
FIG. 6 shows a schematic block diagram of a system for tamper-protecting program code.

FIG. 6 shows a schematic block diagram of a system for tamper-protecting program code. The system comprises a data processing system 600, e.g. a computer such as a PC. The data processing system includes a processing unit 621, e.g. a microprocessor such as a CPU of a computer. The processing unit 621 is connected to a storage device 620, such as a hard disk, a memory card interface, an optical disk device, or the like. The processing unit 621 is suitably programmed to execute one or more automated software tools 622, such as a source-to-source transformer and a postprocessor as described herein. For example, the automated software tool 622 may be adapted to cause the processing unit 621 to load the input representation, e.g. the source code, of the program code from the storage device 620, and the pre-processing steps of the method described herein may be performed automatically by said processing unit. The processing unit 621 may then store the transformed source code on the storage device 620. Alternatively, the processing unit may make the transformed source code available to other programs executed on the data processing systems, e.g. a compiler, and/or output the result via another suitable interface. In yet an alternative embodiment, the automated software tool may process, e.g. compile, the transformed source code directly. Similarly the automated software tool 622, or a separate software tool, may be adapted to cause the processing unit 621 to load the compiled and linked executable image from the storage device 620, and the post-processing steps of the method described herein may be performed automatically by said processing unit.

Example:

In the following aspects of the method described herein will be explained with reference to the following example of a portion of an input source code:

```
int f(int x) {
    int y = g(x);
    int z = g(y);
    return h(x,y);
}
```

In this example, a function g is called twice and a function h is called once. The source-code transformer identifies the three call sites, the corresponding entry points of which are to be encoded. The encoding block then selects an encoding. For the purpose of the present example, it will be assumed that the encoding function selects the following encoding:

$c0 = g \oplus 0x1234$, $c1 = g \oplus h \oplus 0x5678$, where g and h denote the entry points of the functions, $\oplus$ denotes exclusive or, and 0x1234 is a hexadecimal constant. It will be appreciated, however, that any other encoding that fulfills the desired mathematical properties described above may be used instead. This particular encoding is simple to invert:

$$g = c0 \oplus 0 \times 1234,$$

$$h = c1 \oplus g \oplus 0 \times 5678$$

$$= c1 \oplus c0 \oplus 0 \times 1234 \oplus 0 \times 5678$$

$$= c1 \oplus c0 \oplus 0 \times 644C.$$

Subsequently, the transformation block transforms the source code. Given the declarations extern int c[ ];

typedef int(*funptr_g)(int);

where c is an array that contains the encoded entry points and funptr_g is a type which represents function pointers that can point to g, the transformation module can transform the first call to the function g into fun*ptrg_G*=(fun*ptr_g*)(c[0]^0x1234);

*int y=G(x)*;

Here, the first statement computes the entry point of g using the formula $g = c0 \oplus 0x1234$ and the second statement performs the call using the computed function pointer. The typecast (funptr_g) converts the integer-valued expression to a function pointer. A more compact alternative, which skips the typedef and the temporary variable G is:

*int y*=((*int*(*)(*int*))(*c*[0]^0x1234))(*x*);

The transformed source code generated by the transformation block from the above input code thus reads:

```
extern int c[ ];
int f(int x) {
    int y = ((int(*)(int))(c[0] ^ 0x1234))(x);
    int z = ((int(*)(int))(c[0] ^ 0x1234))(y);
    return ((int(*)(int,int))(c[0] ^ c[1] ^ 0x644C))(x,y);
}
```

To ensure correct decoding at run-time, the process further provides the encoded entry points, i.e. includes the transformed constants in the code. It may be observed that the source code itself may be adapted to encode the constants, for instance by the following program statements:

```
int main( ) {
    c[0] = (int) g ^ 0x1234;
    c[1] = (int) g ^ (int) h ^ 0x5678;
    ...
}
```

However, in this case the resulting object code would expose the entry points g and h as well as the selected encoding function. Instead, the post-processor may perform the encoding and patch the linked executable code as described herein.

For example, before compilation/linking, the transformation module may include program statements in the source code causing the array c to be given arbitrary values, e.g.:

int c[2]={1111,2222};

After linking, the actual values of the symbols g and h are known, and may be determined by the post-processor from e.g. a map file generated by the linker. For the purpose of the present example, we assume that:

g=0x80001100, h=0x80001140.

The postprocessor can then compute the encoded values:

$c0 = g \oplus 0x1234 = 0x80000334$, $c1 = g \oplus h \oplus 0x5678 = 0x5638$

The post-processor then modifies the executable image by patching the initializer of the array c so as to substitute the constant 0x80000334 for 1111, and the constant 0x5638 for 2222. During execution of the transformed program, the transformed program thus computes:

c[0]^0x1234=0x80001100=g, and c[0]^c[1]^0x644C=0x80001140=h.

Separate Encoding of Each Call Site:

As described above, the process may generate multiple, distinct encodings of the same entry point. In the present example, different encodings may for instance be used in the two calls to g. To this end, the encoding block may select the following encoding instead:

$c0 = g \oplus 0x1234,$ $c1 = g \oplus h \oplus 0x5678,$ $c2 = h \oplus 0x12345678.$ This encoding thus provides the following two options for computing g:

$g = c0 \oplus 0x1234,$ $g = c1 \oplus h \oplus 0x5678 = c1 \oplus c2 \oplus 0x12340000$ Utilising this alternative formula, the transformation module may thus generate the transformed code as follows:

$int\ y = ((int(*)(int))(c[0]^\wedge 0x1234))(x);$ $int\ z = ((int(*)(int))(c[1]^\wedge c[2]^\wedge 0x12340000))(y);$ $return((int(*)(int,int))(c[0]^\wedge c[1]^\wedge 0x644C))(x,y);$ This alternative encoding thus makes it hard for an attacker to deduce that the first two calls target the same function.

Altering the Encoding Over Time:

If the encoded values are constant, a static analysis may suffice to recover the entry points, e.g. by constant folding. This may be prevented by altering the encoding over time, i.e. during execution of the transformed program. In particular, it may be beneficial when the initial values of c do not form a valid encoding, from which the entry points can be recovered using the formulas that can be found in the object code of the transformed program.

As described above the formulas used when computing the entry points can be extended so that there is a many-to-one relation between the encoded values and the entry points. In the context of the present example, the encoding block may select an encoding function with an added parameter m:

$c0 = g \oplus 0x1234 \oplus m,$ $c1 = g \oplus h \oplus 0x5678,$ $c2 = h \oplus 0x123456780 \oplus m,$ $c3 = m$ The resulting formulas to be used at the call sites by the transformation module become:

$g = c0 \oplus c3 \oplus 0x1234,$ $g = c1 \oplus c2 \oplus c3 \oplus x12340000$ $h = c0 \oplus c1 \oplus c3 \oplus 0x644C$ For example, by setting m=0x11111111 and, as before, assuming g=0x800001100, h=0x80001140 the preprocessor determines:

$c0 = 0x91111225,$ $c1 = 0x5638,$ $c2 = 0x83455629,$ $c3 = 0x11111111$

Now, deliberately setting c3 to an incorrect initial value solves the constant-folding vulnerability. Even if an attacker has correctly identified the formulas that compute the entry points (they may be recovered from the object code), using the initial values of c would produce incorrect results.

The source-code transformer ensures that the correct value of m is set by the running program before it utilizes the formulas that depend on m. To this end, the source-code transformer inserts one or more program statements into the source code that initializes c3.

More diversity may be achieved by altering the parameter m over time. For example, m may be updated in the following manner: $m' = m \oplus n$, using some arbitrary value n (which for instance may be any "useful" value that is computed by the original program). The entire vector c is then updated in the following way:

$c'0 = c0 \oplus n,$ $c'1 = c1,$ $c2 = c2 \oplus n,$ $c'3 = c3 \oplus n$

Note that c1, which is independent of m, is unaffected.

Updating the encoding via pointers to the array c makes an attack by standard data-flow analysis more difficult. For the purpose of the present example, we assume that p is an alias of c which is non-trivial to identify. The initial value of c3 may then be provided in the following manner:

$p[3] = 0x11111111;$

The parameter m, which the encoding depends on, may be altered in the following manner (assuming m'=m \$ n, as before):

$p[0]^\wedge = n;$ $p[2]^\wedge = n;$ $p[3]^\wedge = n;$

Incorporated into the present example, we get $y = ((int(*)(int))(c[0]^\wedge c[3]^\wedge 0x1234))(x);$ /* here we update the encoding: $m = m\ \hat{}\ y*/p[0]^\wedge = y;$
$p[2]^\wedge = y; p[3]^\wedge = y;$ $z = ((int(*)(int))(c[1]^\wedge c[2]^\wedge c[3]^\wedge 0x12340000))(y);$
$return((int(*)(int,int))(c[0]^\wedge c[1]^\wedge c[3]^\wedge 0x644C))$
$(x,y);$ As pointed above, in the context of multi-threaded execution, it may be beneficial to protect the update from hazards that result from possible multi-threaded execution, e.g. by storing the encoded values on the run-time stack.

Disguising the Obfuscated Calls:

The obfuscated calls are very unusual in that their targets are computed, thereby causing the obfuscated code to stand out in a larger body of unprotected code. Disguising the calls as (virtual) method calls, which are common in e.g. C++, makes the obfuscated code blend better with other code.

Although there may be variations depending on compiler, application binary interface, operating system and processor architecture, a C++ method call has generally the following form (illustrated by lowering the C++ to C code):

(this->*vtor*.method1)(argument);

A dispatch table ("vtor") contains entries for all virtual methods of a class (including inherited ones). Each entry, like method1, is a function pointer. The dispatch table is accessed via the instance pointer ("this").

In one embodiment, the source-code transformer adds a "dummy" instance pointer p, through which a dispatch table can be accessed, and generates the obfuscated call to look like a method call:

*int y=(p->vtor.g)(x);*

Using an array instead of a vtor structure further increases the complexity of the source code, but should result in identical object code and saves the transformer from the task of generating new types:

*int y=((int(\*)(int))(p->vtor[0]))(x);*

By using a pointer alias, q, to the dispatch table it is non-trivial for an attacker to see that q[0] and p->vtor[0] refer to the same entity. Before g is called, q[0] is computed using the same formula as before.

q[0]=c[0]^0x1234;

The transformed source code of the present example thus becomes

```
extern int c[ ];
struct Instance { int *vtor };
int f(Instance *p, int x, int *q) {
  int y,z;
  q[0] = c[0] ^ 0x1234;
  q[1] = c[1] ^ c[2] 0x12340000;
  q[2] = c[0] ^ c[1] ^ 0x644C;
  y = ((int(*)(int))(p->vtor[0]))(x);
  z = ((int(*)(int))(p->vtor[1]))(y);
  return ((int(*)(int,int))(p->vtor[2]))(x,y);
}
```

Hence, in the above, embodiments have been described of an efficient method for obfuscating the call graph of a computer program. While the original source code is vulnerable to a form of static analysis by disassembling the executable code, the transformed code resulting from the method described herein prevents call sites and entry points of functions, which are called using direct call instructions from being related to each other by an attacker, since no direct call instructions result from compiling the transformed source code. In particular, varying the encoding and ensuring that the initial encoding is invalid effectively blocks a number of possible attacks.

Although some embodiments have been described and shown in detail, the invention is not restricted to them, but may also be embodied in other ways within the scope of the subject matter defined in the following claims.

It will further be appreciated that the method described herein may be applied to the tamper-protection of computer program code for a large variety of data processing systems, e.g. conventional computers, e.g. desktop computers, personal computers, portable computers, laptops, portable radio communications equipment, and/or other handheld or portable devices. The term portable radio communications equipment includes all equipment such as mobile telephones, pagers, communicators, i.e. electronic organisers, smart phones, personal digital assistants (PDAs), handheld computers, or the like.

It will further be appreciated that the method described herein may be combined with other tamper-protection techniques, e.g. other code obfuscation techniques, such as code encryption and/or other techniques e.g. as described in Colberg et al. (ibid.) such as approaches for obfuscation of the local control flow within a function. The method described herein complements such transformations by offering a mechanism that obfuscates function calls. In some embodiments, the method described herein may be combined with obfuscation methods that prevent the dynamic analysis of the program code, so as to further increase the protection against undesired tampering attempts based on an analysis and/or reverse engineering of the software component to be protected.

A possible dynamic attack may include the recording of entry points of functions when a call site is executed. However, the down-side of such a dynamic analysis is that it underestimates the call graph. An attacker does not know when all possible execution paths through the code have been exercised. In particular, an attacker is faced with the problem of providing stimuli that will trigger functionality that he or she might not be aware of. Further, if a call site is polymorph, i.e. refers to one out of several functions depending on the program state, it is insufficient to execute the call only once. Again, it is non-trivial to come up with stimuli that exercise every possible call. Thus, the method described in here provides particularly good protection for software components that make heavy use of polymorphism, e.g. when the code of the transformed calls looks the same as the polymorph calls, as described herein.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A computer-implemented method of tamper-protecting a computer program, the method comprising:
    processing, by a computer, an input representation of the computer program to identify a function call for causing a data processing system to continue execution of the computer program at a predetermined entry point memory address of a function when the execution has reached a calling site, and upon termination of the function to return to the calling site and to continue execution of the computer program from the calling site onwards, when the computer program is executed by a data processing system;
    replacing, by the computer, the identified function call with a modified function call, wherein the modified function call includes an algebraic expression for causing the data processing system to compute the entry point memory address when the computer program is executed by the data processing system, and the algebraic expression represents a decoding function for computing the entry point memory address from a set of parameters;
    determining a respective parameter value of each of the set of parameters from an encoding function corresponding to the decoding function; and
    generating an executable representation of the computer program from the input representation, wherein the executable representation includes one or more computer-executable instructions for causing the data processing system to assign the determined parameter values to respective ones of the set of parameters.

2. The method of claim 1, wherein generating the executable representation comprises:
   transforming the input representation into a preliminary executable representation; and
   modifying the preliminary executable representation to include the one or more computer-executable instructions for causing the data processing system to assign the determined parameter values to respective ones of the set of parameters.

3. The method of claim 2, wherein replacing the identified function call with a modified function call includes inserting one or more program statements into the input representation for assigning a respective preliminary value to each of the set parameters; and modifying the preliminary executable representation includes modifying one or more computer-executable instructions corresponding to the inserted one or more program statements to cause the data processing system to assign the determined parameter values to respective ones of the set of parameters.

4. The method of claim 1, further comprising identifying a plurality of function calls and replacing the function calls by respective modified function calls, wherein each modified function call corresponds to a different decoding function.

5. The method of claim 1, further comprising:
   providing an extended encoding function representing a many-to-one relation between a memory address and the set of parameters, wherein a plurality of sets of parameter values of the set of parameters encode the memory address; and
   inserting one or more additional program statements adapted to cause the data processing system to change a current set of parameter values of the set of parameters from a first one of the plurality of sets of parameter values to a second one of the plurality of sets of parameter values when the program code is executed by the data processing system.

6. The method of claim 5, wherein the one or more additional program statements include one or more parameter pointers to respective memory addresses for storing the set of parameter values.

7. The method of claim 1, further comprising inserting one or more auxiliary program statements adapted to cause the data processing system to assign a set of temporary parameter values to the set of parameters, wherein the set of temporary parameter values results in a value of the decoding function different from the entry point memory address.

8. The method of claim 7, wherein the one or more auxiliary program statements are adapted to cause the data processing system to assign the set of temporary parameter values to the set of parameters as a set of initial values.

9. The method of claim 1, further comprising parsing the input representation to identify the function call.

10. The method of claim 1, wherein the input representation of the computer program includes at least one input source code module.

11. The method of claim 1, further comprising:
    identifying a dispatch table including one or more references to respective entry point addresses;
    inserting respective one or more executable statements into the input representation for calculating the entry point addresses; and
    replacing the one or more references with pointers to corresponding ones of the inserted executable statements.

12. The method of claim 1, further comprising obfuscating the function call by at least one of a function pointer and a dispatch table.

13. The method of claim 1, wherein the identified function call includes a reference to a function name, and replacing the identified function call comprises replacing the reference by executable code for computing the corresponding entry point address word.

14. A computer configured to perform the steps of the method of claim 1.

15. A non-transitory computer-readable medium encoded with instructions that, when executed by the computer, cause the computer to perform the method of tamper-protecting a computer program of claim 1.

16. The non-transitory medium of claim 15, wherein the instructions further comprise:
    a transformation module for identifying a function call in an input representation of an input computer program and for replacing the identified function call with a modified function call including an decoding function; and
    a postprocessing module for modifying an executable representation of the input computer program to include one or more computer executable instructions representing an encoding function corresponding to the decoding function.

* * * * *